Figure 1:
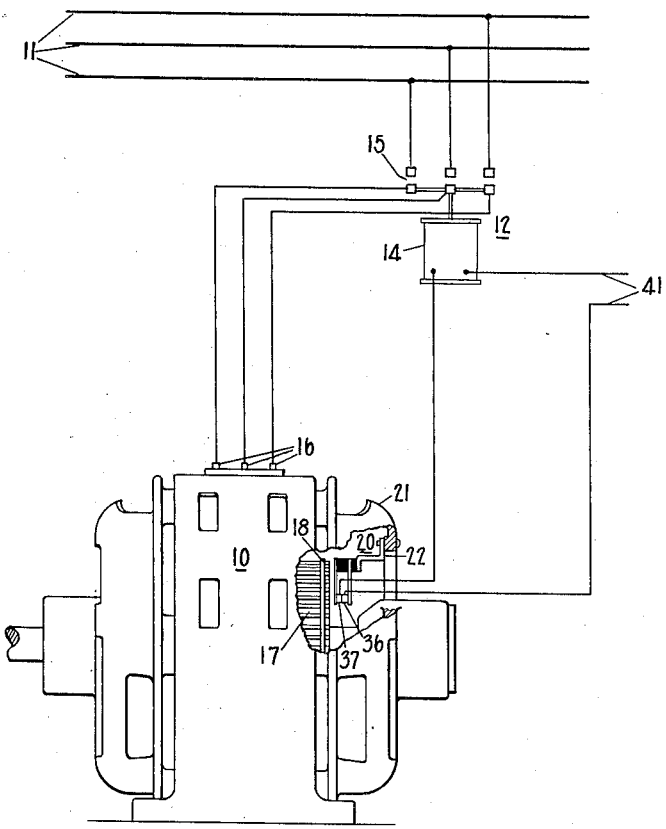

Aug. 10, 1937.   W. H. BRUNS   2,089,249
PROTECTIVE DEVICE FOR SQUIRREL CAGE INDUCTION MOTORS
Filed Dec. 11, 1935

William Henry Bruns INVENTOR

BY Mathew E. J. Bradley  ATTORNEY

Patented Aug. 10, 1937

2,089,249

UNITED STATES PATENT OFFICE 2,089,249

PROTECTIVE DEVICE FOR SQUIRREL CAGE INDUCTION MOTORS

William Henry Bruns, Yonkers, N. Y., assignor to Otis Elevator Company, New York, N. Y., a corporation of New Jersey Application December 11, 1935, Serial No. 53,878

6 Claims. (Cl. 172—120)

This invention relates to protective devices for squirrel cage induction motors.

Alternating current induction motors of the squirrel cage type are frequently used in elevator installations. The rotor of a motor of such character is provided with one or more short circuiting end rings at each of its ends. If for any reason the motor fails to start or becomes stalled, such, for example, as by the failure of the motor brake to release or by the failure of the motor accelerating switches to properly operate, the end rings become excessively heated. Such heat is injurious to the motor and if the motor is left in circuit the stator windings may become ignited and the motor burned out.

It is the object of this invention to provide a protective device which affords protection against the stalled rotor condition of a squirrel cage induction motor.

In carrying out the invention, a thermally operated protective device is mounted so as to receive heat radiated from an end ring of a rotor. The device is positioned in non-heat conductive relation with the other parts of the motor, and the air set in motion by the rotation of the rotor is not relied on to operate the device. When the temperature of the end ring reaches a predetermined degree, the device operates to disconnect the motor from its source of power.

The features and advantages of the invention will become apparent from the specification and appended claims.

The invention will be described in connection with a squirrel cage induction motor of a type suitable for operation as the hoisting motor of an elevator installation.

Figure 2:
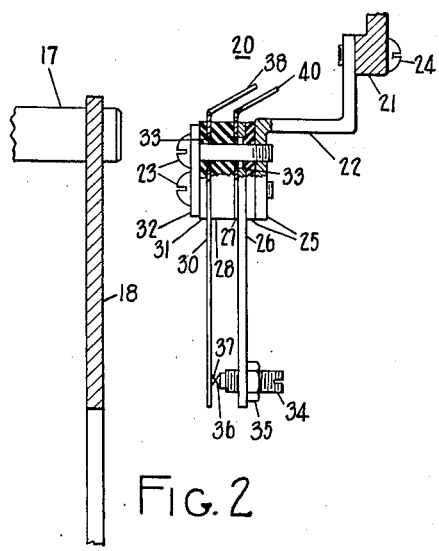

In the drawing:

Figure 1 is view illustrating diagrammatically the invention as applied to protect a squirrel cage induction motor; and Figure 2 is an enlarged side view illustrating the details of construction of a thermally operated protective device which may be used in carrying out the invention.

Referring to Figure 1, the circuit through which a squirrel cage induction motor 10 receives power from suitable supply mains 11 is controlled by a magnetic switch 12, biased to open position as shown. The switch operates upon energization of its coil 14 to close its contacts 15, which connect the terminals 16 of the motor to the supply mains. The rotor 17 of the motor is provided with short circuiting end rings such as the end ring 18 as illustrated in the drawing. If for any reason the rotor should stall while the motor is connected to the supply mains, the rotor end rings become dangerously heated.

In accordance with the invention, a thermal cut-out generally designated 20 is positioned inside the motor end housing 21 adjacent the end ring 18. The cut-out is arranged to operate when the temperature of the end ring reaches a predetermined degree, to disconnect the motor from the supply mains 11.

Referring also to Figure 2, the cut-out 20 is mounted on one end of a bracket 22 as by the screws 23. The other end of the bracket is secured to the inside of the end housing 21 by means of a screw 24. The cut-out comprises, starting with bracket 22 and mounted thereon in consecutive pile up order, an insulating spacer 25, a base plate 26, a contacting plate 27, an insulating spacer 28, a bimetallic element 30, an insulating spacer 31 and a metallic cap plate 32. The pile up parts are clamped together on the bracket by means of the screws 23, with spacer 25 in contact with the bracket. The screws pass through apertures in the pile up parts and are threaded into the bracket. The spacer 31 is provided with shoulders 33 fitting in the apertures in the bimetallic element for the screws 23, whereby the bimetallic element is insulated from the screws. Similar shoulders 33 are also formed on spacer 28 and on spacer 25 for insulating the contacting plate and the base plate, respectively, from the screws 23.

Base plate 26 is mounted at one end on bracket 22. The other or free end of base plate 26 extends downward from the bracket and carries an adjusting screw 34 and a lock nut 35 thereon. Screw 34 is provided with a contact 36. The bimetallic element extends in the same direction as the base plate and is in line with the base plate. The cut-out is positioned with the outer surface of the bimetallic element directly in front of end ring 18, and substantially parallel thereto. The distance between the bimetallic element and the end ring is small, preferably about one inch. The outer surface of bimetallic element 30 may be blackened with a suitable substance such as lamp black so as to best absorb the radiant heat from the end ring. A contact 37 is carried by the free end of the bimetallic element for cooperation with the fixed contact 36. By adjusting fixed contact 36 an initial deflection of bimetallic element 30 is provided so as to maintain contact 37 in engagement with contact 36 until the temperature of the bimetallic element due to radiant heat received from the end ring reaches a predetermined value. When this point is reached the contacts separate. A terminal 38 is provided on the opposite end of the bimetallic element and a similar terminal 40 is provided on the contacting plate 27, for connecting the cut-out in the circuit.

The cut-out is illustrated as arranged in the control circuit 41 for the coil 14 of switch 12. Assume that coil 14 is energized so that switch 12 closes to connect the motor to supply mains 11. During normal operation of the motor the temperature of the end ring does not attain a sufficiently high value for operating the cut-out. However, should the rotor stall, the temperature of the end ring rises very rapidly and the heat radiated therefrom to the bimetallic element causes the separation of contact 37 from contact 36. This deenergizes coil 14, which opens switch 12 to disconnect the motor from the supply mains. For example, a certain elevator motor hoisting full load draws approximately 50 amperes from the line, and its end rings reach a temperature of about 100 degrees centigrade. The same motor with its rotor stalled draws approximately 161 amperes from the line, and its end rings reach a dangerously high temperature in about 30 seconds. With such a motor, a thermal cut-out in accordance with the invention was set to separate its contacts when the temperature of the end ring reached approximately 300 degrees centigrade, and was found to give excellent protection against stalled rotor conditions.

Upon normal operation of the motor, the cooling air drawn through the openings in the motor housing and circulated therethrough exerts a cooling effect on the motor end rings. However, this air is not relied upon to operate the thermal cut-out, its operation being due to the heat radiated from the end rings when the end rings reach a predetermined temperature. Also, the cut-out is mounted on the bracket 22 and insulated therefrom by the insulating spacer 25 so that no heat is conducted to it from other parts of the motor.

What is claimed is:

1. A thermally operable protective device for a squirrel cage induction motor comprising; a thermal element mounted in proximity to an end ring of said motor to receive heat radiated directly therefrom and in non-heat conducting relation to all parts of said motor; and circuit controlling means operable by said thermal element, upon the temperature of said end ring attaining a predetermined value, to discontinue the power supply to said motor.

2. A thermally operable protective device for a squirrel cage induction motor comprising; circuit controlling means adapted upon operation to effect the disconnection of said motor from its source of current supply; and a thermal element disposed in radiant energy receiving relation to an end ring of said motor and operable at a temperature greater than that of the circumambient medium to operate said circuit controlling means.

3. A thermally operable protective device for a squirrel cage induction motor comprising; a bimetallic element circuit controlling means operable thereby for controlling the connection of said motor to its source of current supply; means mounting said element within the motor casing in non-heat conducting relation with the motor parts but in close proximity to an end ring of the rotor of said motor to receive heat radiated directly therefrom; and means for adjusting said bimetallic element to cause it to operate the circuit controlling means at a certain temperature so as to insure the disconnection of said motor from said source, upon the stalling of its rotor, before the motor is damaged.

4. In a system of protection for a squirrel cage induction motor; a thermal cut-out comprising a pair of contacts for controlling the connection of said motor to said source, said contacts being normally engaged, a bimetallic element operable to separate said contacts upon attaining a predetermined temperature; and means mounting said cut-out in non-heat conducting relation with said motor but with the bimetallic element in proximity to an end ring of the motor to be subject to the heat radiated therefrom so as to separate said contacts to effect the disconnection of said motor from said source upon a rapid increase of heat radiated from the end ring due to stalling of the rotor of said motor.

5. In a system of protection for a squirrel cage induction motor; a thermal cut-out comprising a bimetallic element, a pair of normally engaged contacts for controlling the connection of said motor to its source of current supply, said contacts being adapted for separation by said element, and adjusting means for predetermining the temperature at which said element effects such separation; and means mounting said cut-out in non-heat conducting relation with all parts of the motor but with the bimetallic element in close proximity to an end ring of the motor to receive heat radiated directly therefrom, said adjusting means being set so that, upon the stalling of the rotor of said motor, the resultant rapid increase of heat radiated from the end ring to said bimetallic element causes said element to separate said contacts, thereby effecting the disconnection of said motor from said source.

6. In a system of protection for a squirrel cage induction motor in which an electromagnetic switch is provided for connecting the motor to a source of current supply; a circuit for the coil of said switch; a thermal cut-out in said circuit, said cut-out comprising a pair of normally engaged contacts, a bimetallic element for disengaging one of said contacts from the other, and means for adjusting said contacts to predetermine the temperature at which said bimetallic element effects their separation; and means for mounting said cut-out within the motor casing in non-heat conducting relation with any part of the motor but with the bimetallic element in close proximity to and facing an end ring of the motor to receive heat radiated directly therefrom, said adjusting means being set so that, upon the stalling of the rotor of said motor, the resultant rapid increase of heat radiated from the end ring to said bimetallic element causes said element to separate said contacts, thereby deenergizing said switch to disconnect said motor from said source.

WILLIAM HENRY BRUNS.